United States Patent [19]

Kamimori et al.

[11] 4,338,000
[45] Jul. 6, 1982

[54] ELECTROCHROMIC LIGHT CONTROLLING PANEL

[75] Inventors: Tadatoshi Kamimori, Tokyo; Mamoru Mizuhashi, Yokohama, both of Japan

[73] Assignee: Asahi Glass Company, Ltd., Tokyo, Japan

[21] Appl. No.: 186,124

[22] Filed: Sep. 11, 1980

[30] Foreign Application Priority Data

Oct. 25, 1979 [JP] Japan ................................ 54-137050

[51] Int. Cl.³ ............................................... G02F 1/17
[52] U.S. Cl. ................................................... 350/357
[58] Field of Search ............................. 350/357, 355, 356

[56] References Cited

U.S. PATENT DOCUMENTS

| | | | |
|---|---|---|---|
| 3,708,220 | 1/1973 | Meyers et al. | 350/357 |
| 3,844,636 | 10/1974 | Maricle et al. | 350/357 |
| 4,053,209 | 10/1977 | Hara et al. | 350/357 |
| 4,182,551 | 11/1980 | Washida et al. | 350/357 |
| 4,278,329 | 7/1981 | Matsuhiro et al. | 350/357 |

Primary Examiner—James W. Davie
Attorney, Agent, or Firm—Oblon, Fisher, Spivak, McClelland & Maier

[57] ABSTRACT

Infra-red reflecting electrochromic light controlling panel comprising, successively in laminated structure, first transparent plate, a transparent electroconductive film, an interlayer of polymer electrolyte, first tungsten oxide film, an infra-red reflecting and electroconductive metal film, second tungsten oxide film and second transparent plate. The first tungsten oxide film is colored when it is applied to negative voltage. The panel can be used as an infra-red reflecting window which regulates the transmission of visible light and solar energy by applying electric field to the first tungsten oxide film.

5 Claims, 1 Drawing Figure

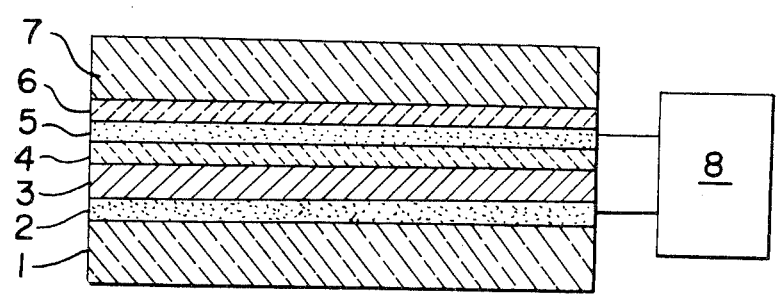

ELECTROCHROMIC LIGHT CONTROLLING PANEL

BACKGROUND OF THE INVENTION

1. Field of the Invention

The present invention relates to an electro-optical light controlling panel. More particularly, it relates a light controlling panel utilizing an electrochromic material and having infra-red reflecting characteristic.

2. Description of the Prior Arts

A glass panel utilizing electrochromic phenomenon will be used as a light controlling glass panel. The light controlling glass panel can automatically or manually control the light transmission through the panel in response to the intensity of the incident light as rapidly as desired, and will be used as a window glass for a building, a car or an airplane or a cover glass panel for a picture surface of a television.

Such light controlling glass panel substantially comprises a glass plate, a transparent electroconductive film as an electrode formed on the glass plate, a tungsten oxide layer as an electrochromic material formed on the film, an electrolyte layer containing a proton or an alkali metal ion which contacts with the tungsten oxide layer and an electroconductive film as a counter-electrode which contacts with the electrolyte layer in a basical structure.

When a negative potential is applied to the electrochromic material of the light controlling glass panel, cations and electrons corresponding to the cations are injected whereby the cations and electrons are mutually affected to the electrochromic material to result in light absorptions in the visible region. Such phenomenon is considered to be caused by the fact that the color center is formed by the following reaction to color the film blue when negative potential is applied to a tungsten oxide film.

$$WO_3(\text{colorless}) + XM^+ + Xe^- \rightarrow M_xWO_3(\text{blue color})$$

wherein $M^+$ represents a proton or a cation such as an alkali metal ion.

SUMMARY OF THE INVENTION

It is an object of the present invention to impart infra-red reflecting characteristics to an electrochromic light controlling panel.

It is another object of the present invention to improve visible light transmitting and infra-red reflecting characteristics in a case that tungsten oxide is used as an electrochromic material and to provide a light controlling panel useful as a window glass for a building or a car.

The electro-optical light controlling panel according to the present invention has a structure forming a first transparent plate made of glass or transparent plastic, a transparent electroconductive film, an interlayer film made of a polymer electrolyte, a first tungsten oxide ($WO_3$) film, an infra-red reflecting and electroconductive metal film, a second tungsten oxide film and a transparent plate made of glass or transparent plastic, in order and comprises a device for applying a potential between the transparent electroconductive film and the infra-red reflecting and electroconductive metal film to apply a positive or negative potential to the first tungsten oxide film so as to control the light transmission.

BRIEF DESCRIPTION OF THE DRAWING

FIG. 1 is a sectional view of one embodiment of the electro-optical light controlling panel according to the present invention.

DETAILED DESCRIPTION OF THE PREFERRED EMBODIMENTS

In the FIGURE the reference numeral (1) designates a glass plate or a hard plastic plate made of polycarbonate, polymethacrylate, etc.; and (2) designates a transparent electroconductive film made of $In_2O_3$ in which Sn is doped or $SnO_2$ in which Sb is doped. The film is used as one of the electrode for applying a potential to the electrochromic tungsten oxide film which is formed on the transparent plate by a vacuum deposition method or a sputtering method. A thickness of the film is preferably in a range of 300 to 5000 Å and a surface resistivity of the film is preferably in a range of 1 to 100 ohm/sq. The reference numeral (3) designates an interlayer film having adhesiveness made of a polymer electrolyte which has OH groups, oranic acid groups or ester groups. Suitable interlayer films are preferably made of a hydrophilic polymer such as polyvinyl alcohol, polyacrylic acid, polyvinyl acetate and polyvinyl butyral. An adhesive agent having amino groups such as aminosilane, vinyl pyridine, nylon, or copolymers thereof can be also used. Polymer electrolytes used as ion-exchange membranes can be also used as the interlayer film in the present invention. The alkali metal salts of the polymers formed by treating the polymer with an alkali metal ion such as $Na^+$ or $Li^+$ can be also used. Among these polymers, polyvinyl butyral is optimum in view of weathering resistance and adhesiveness. The interlayer film bonds the first transparent plate having the electroconductive film and the second transparent plate having the tungsten oxide film, the metal film and the tungsten oxide film and also it injects protons into the first tungsten oxide film having electrochromic effect or extracts protons from the tungsten oxide film. The thickness of the interlayer film is preferably thinner in view of lower electric resistance and is preferably in a range of 25 to 100$\mu$ in view of adhesiveness and weathering resistance. The reference numeral (4) designates the first tungsten oxide film which has electrochromic effect for coloring by applying negative potential, but fading or bleaching by applying positive potential. The film and the second tungsten oxide film (6) increase the visible light transmission of the panel at the fading or bleaching state. The reference numeral (5) designates the metal film which works as the other electrode for applying the potential to the first tungsten oxide film and imparts high infra-red reflection to the light controlling panel. The reference numeral (6) designates the second tungsten oxide film and the film and the first tungsten oxide film impart high visible light transmission of the metal film, and (7) designates the second transparent plate made of glass or a hard transparent plastic; (8) designates the device for applying positive or negative potential to the first tungsten oxide film (4) and which connects to the electroconductive film (2) and the metal film (5). The device (8) usually comprises a power source, a switch, a capacitor and a push-button. The metal film (5) has high electroconductivity and high infra-red reflecting property and is made of Ag. Cu, Al, Au, Ti, Sn or an alloy thereof. The optimum metal is Ag. and a preferable metal is Cu, Al, Ag-Cu alloy or Ag-Al alloy. It is possible to use Fe, Co, Ni, Cr, In or an alloy thereof though the infra-red reflecting property is not so high. The metal film reflects light in near infra-red region for major heat energy source of solar light to reduce solar energy transmission. The metal film should have satisfactory visible light transmission at the fading or bleaching state of the panel. The durability of the metal film as the electrode is higher and the infra-red reflection is higher but the visible light transmission is lowering depending upon increase of the thickness of the metal film. The thickness of the metal film is preferably in a range of 100 to 300 Å. When Ag is used for the metal film, the visible light transmission can be increased about 70% or higher and the solar energy transmission can be reduced to about 50% or lower.

The response as the electrochromic film is improved depending upon increase of the thickness of the first tungsten oxide film (4). On the other hand, tungsten oxide is a dielectric substance having refractive index of about 2.1. The first and second tungsten oxide films increase the visible light transmission of the metal film superposed between the films by light interference effect. The thicknesses of the first and second tungsten oxide films are respectively in a range of 100 to 700 Å, preferably 350 to 500 Å and 1500 to 2000 Å, preferably 1700 to 1900 Å. In such range, the visible light transmission of the panel at the fading or bleaching state can be increased to about 70% or higher. When only Ag film is formed on a glass plate having a thickness of 2 to 5 mm, the visible light transmission is only about 20 to 40%.

The first and second tungsten oxide films is usually formed by a vacuum evaporation coating method and can be also formed by the other method such as sputtering method, ion-plating method, chemical vapor deposition method, or chemical liquid deposition method. The metal film is usually formed by the vacuum evaporation coating method. In the case of the Ag film or Cu film, it can be formed by the electrodeless deposition method.

One embodiment of the preparation of the light controlling panel of the present invention will be illustrated.

In a vacuum tank maintaining a vacuum degree of 1 to $5 \times 10^{-5}$ torr, the second tungsten oxide film (6) is formed on the glass plate (7) at 20° C. to 150° C. and then, the metal film (5) and the first tungsten oxide film (4) are sequentially formed in each desired thickness.

The electroconductive film (2) made of $In_2O_3$ containing a small amount of $SnO_2$ is deposited on the glass plate (1) in the same condition. The interlayer film (3) made of polyvinyl butyral is held between the two kinds of the coated glass plates (1, 7) and they are heated under compression as the same as the conventional preparation of a laminated safety glass to bond the two glass plates in one piece.

The glass plates can be also laminated by coating a solution of an adhesive polymer electrolyte in an organic solvent such as ethanol on the inner surface of one glass plate and superposing the other glass plate and compressing them.

The light controlling plate of the present invention has high visible light transmission and low solar energy transmission based on high infra-red reflection at the fading or bleaching state. When negative potential is applied to the first tungsten oxide film, the first tungsten oxide film is coloring to reduce the visible light transmission and the solar energy transmission for about 20 to 40%, whereas when positive potential is applied to it, the panel returns to the original state. Therefore, the light controlling panel can be used for curtainless window glass for a building, a window glass for a car, sun viser, anti-glare mirror and others.

The present invention will be further illustrated by certain examples and references which are provided for purposes of illustration only and are not intended to be limiting the present invention.

EXAMPLES

Light controlling panels of Examples 1 to 6 shown in Table were prepared by the following process.

The first and second transparent plates were respectively float glass plates having a thickness of 3 mm. The $In_2O_3$ film containing 5 wt. % of $SnO_2$ having a thickness of 1000 Å or 2000 Å was formed on each first transparent plate by the vacuum evaporation coating method. The second tungsten oxide film ($WO_3$), the metal film (Ag, Al or Cu) and the first tungsten oxide film ($WO_3$) (thicknesses shown in Table) were respectively formed on the second transparent plate by a vacuum evaporation coating method.

Each interlayer film made of polyvinyl butyral or polyacrylic acid as the adhesive polymer electrolyte was used to bond the two transparent plates. When polyvinyl butyral film was used, the film was held between the two transparent plates and the two plates were bonded by heating under compression. When polyacrylic acid was used, 50% ethanol solution of polyacrylic acid was coated one surface of one plate and the other plate was bonded under compression.

In the fading or bleaching conditions of the light controlling panels, that is, the condition before applying the potential to the first tungsten oxide film or the condition returned to the original condition by applying positive potential after applying negative potential to the tungsten oxide film, each percent visible light transmission ($T_v$), each percent visible light reflection ($R_v$), each percent solar energy transmission ($T_E$) and each percent solar energy reflection ($R_E$) were measured. The results are shown in Table in the columns of "Faded".

In the coloring conditions of the panels given by applying 3 V DC voltage to the first tungsten oxide film for 3 minutes, $T_v$, $R_v$, $T_E$ and $R_E$ were also measured. The results are shown in Table in the columns of "Colored".

TABLE

|  | Exp. 1 | | Exp. 2 | | Exp. 3 | |
|---|---|---|---|---|---|---|
| First transparent plate | Float glass 3 mm | | Float glass 3 mm | | Float glass 3 mm | |
| Transparent electroconductive film | $In_2O_3+SnO_2$ 1000 Å | | $In_2O_3+SnO_2$ 2000 Å | | $In_2O_3+SnO_2$ 2000 Å | |
| Interlayer film | Polyvinyl butyral 50μ | | Polyvinyl butyral 50μ | | Polyvinyl butyral 50μ | |
| Thickness of first $WO_3$ film | 500 Å | | 500 Å | | 1800 Å | |
| Metal film | Ag 150 Å | | Al 100 Å | | Ag 120 Å | |
| Thickness of second $WO_3$ film | 500 Å | | 500 Å | | 1800 Å | |
| Second transparent plate | Float glass 3 mm | | Float glass 3 mm | | Float glass 3 mm | |
|  | Faded | Colored | Faded | Colored | Faded | Colored |
| % visible light transmission | 70 | 45 | 55 | 30 | 70 | 40 |
| % visible light reflection | 20 | 25 | 10 | 15 | 20 | 25 |
| % solar energy | | | | | | |

TABLE-continued

| | | | | | | |
|---|---|---|---|---|---|---|
| transmission | 45 | 15 | 40 | 10 | 45 | 10 |
| % solar energy reflection | 45 | 50 | 25 | 30 | 45 | 50 |

| | Exp. 4 | Exp. 5 | Exp. 6 |
|---|---|---|---|
| First transparent plate | Float glass 3 mm | Float glass 3 mm | Float glass 3 mm |
| Transparent electroconductive film | $In_2O_3 + SnO_2$ 2000 Å | $In_2O_3 + SnO_2$ 2000 Å | $In_2O_3 + SnO_2$ 2000 Å |
| Interlayer film | Polyvinyl butyral 50μ | Polyvinyl butyral 50μ | Polyacrylic acid 50μ |
| Thickness of first $WO_3$ film | 400 Å | 1800 Å | 1800 Å |
| Metal film | Ag 120 Å | Cu 120 Å | Ag 120 Å |
| Thickness of second $WO_3$ film | 400 Å | 1800 Å | 1800 Å |
| Second transparent plate | Float glass 3 mm | Float glass 3 mm | Float glass 3 mm |

| | Faded | Colored | Faded | Colored | Faded | Colored |
|---|---|---|---|---|---|---|
| % visible light transmission | 80 | 50 | 65 | 35 | 70 | 35 |
| % visible light reflection | 10 | 15 | 10 | 15 | 20 | 25 |
| % solar energy transmission | 55 | 25 | 40 | 5 | 45 | 5 |
| % solar energy reflection | 35 | 40 | 40 | 42 | 45 | 50 |

We claim:

1. An infra-red reflecting and electrochromic light controlling panel which comprises a first transparent plate (1) made of glass or plastic; a transparent electroconductive film (2); an interlayer film made of a polyelectrolyte; a first tungsten oxide film (4), an infra-red reflecting and electroconductive metal film (5), a second tungsten oxide film (6) and a transparent plate (7) made of glass or a plastic which are laminated in said order; and a device for applying potential between said transparent electroconductive film and said infra-red reflecting and electroconductive metal film whereby light transmission is controlled by applying positive or negative potential to said first tungsten oxide film.

2. The panel according to claim 1 wherein said transparent electroconductive film is made of $In_2O_3$ and/or $SnO_2$.

3. The panel according to claim 1 wherein said interlayer film is made of polyvinyl butyral or polyacrylic acid.

4. The panel according to claim 1 wherein said infrared reflecting film is a film having a thickness of 100 to 300 Å and selected from the group consisting of Ag, Cu, Al, Au, Ti and Sn and an alloy thereof.

5. The panel according to claim 1 wherein the said first and second tungsten oxide films have a thickness of 100 to 700 Å and 1500 to 1900 Å respectively.

* * * * *